(12) United States Patent
Terasaki et al.

(10) Patent No.: US 7,624,971 B2
(45) Date of Patent: Dec. 1, 2009

(54) HUMIDIFYING SYSTEM

(75) Inventors: Takayuki Terasaki, Yokosuka (JP);
Masahiro Usuda, Yokohama (JP);
Masaaki Nakata, Yokohama (JP)

(73) Assignee: Nissan Motor Co., Ltd., Yokohama, Kanagawa (JP)

( * ) Notice: Subject to any disclaimer, the term of this patent is extended or adjusted under 35 U.S.C. 154(b) by 66 days.

(21) Appl. No.: 11/997,469

(22) PCT Filed: Aug. 3, 2006

(86) PCT No.: PCT/IB2006/002125

§ 371 (c)(1),
(2), (4) Date: Jan. 31, 2008

(87) PCT Pub. No.: WO2007/017722

PCT Pub. Date: Feb. 15, 2007

(65) Prior Publication Data

US 2009/0130495 A1    May 21, 2009

(30) Foreign Application Priority Data

Aug. 5, 2005   (JP) .............................. 2005-228732

(51) Int. Cl.
*B01F 3/04* (2006.01)
(52) U.S. Cl. .......................... 261/104; 261/107; 429/12
(58) Field of Classification Search ................ 261/104, 261/107, 143–145, 154, DIG. 65, DIG. 83; 431/261, 326–329; 429/12
See application file for complete search history.

(56) References Cited

U.S. PATENT DOCUMENTS

| 6,669,177 | B2 * | 12/2003 | Shimanuki et al. ............. 261/96 |
| 6,755,399 | B2 * | 6/2004 | Shimanuki et al. ........... 261/104 |
| 2001/0015501 | A1 * | 8/2001 | Katagiri et al. .............. 261/104 |
| 2001/0021467 | A1 | 9/2001 | Suzuki et al. |
| 2005/0110172 | A1 | 5/2005 | Tanaka et al. |

FOREIGN PATENT DOCUMENTS

| JP | 55-137007 A | * 10/1980 |
| JP | 2001-201122 A | 7/2001 |

* cited by examiner

*Primary Examiner*—Richard L Chiesa
(74) *Attorney, Agent, or Firm*—Young Basile (57) ABSTRACT

A device includes a housing having a hollow center and a case having a hollow fiber membrane. The case is at least partially located inside the hollow center of the housing. A first gas flow flows to the hollow center through an introducing pipe and exits the housing via a discharging pipe. A second gas flow flows through the hollow fiber membrane in the case. The first gas flow enters the case through an inflow opening in the case from a gap between a wall of the housing and the case and exits the case through a discharging opening in the case to the gap between the wall of the housing and the case. The introducing pipe is located adjacent to a dividing wall. The device provides a humidifying property by transferring moisture from the first gas flow to the second gas flow or vice versa.

20 Claims, 5 Drawing Sheets

HUMIDIFYING SYSTEM

CROSS-REFERENCE TO RELATED APPLICATIONS

This application claims priority to Japanese Patent Application No. 2005-228732, filed Aug. 5, 2005, the entire content of which is incorporated herein by reference.

TECHNICAL FIELD

The invention relates to humidifying systems, and more particularly, but without limitation, to humidifying systems for fuel cells.

BACKGROUND

Some fuel cells include a humidifying system to humidify inlet gasses. Humidifying systems are used in fuel cells to increase the average current density of a fuel cell. Inlet gasses require an optimal humidity level to produce the highest average current density possible for a particular fuel cell. One technique for increasing humidity of inlet gasses to reach an optimal level is to transfer moisture from the outlet gasses, which have high moisture content from water produced during the chemical reaction in the fuel cell, to the inlet gasses.

A humidifying system used in a fuel cell system may use a hollow fiber membrane. A hollow fiber membrane provides pores on the inside of the hollow fiber membrane to separate moisture from a gas flow. The moisture of outlet gasses that flows inside the hollow fiber membrane is transferred to the outside of the hollow fiber membrane to humidify inlet gasses flowing on the outside of the hollow fiber membrane.

SUMMARY

However, hollow fiber membranes are not particularly strong and are subject to fracture inside a humidifying system. Fracture of the hollow fiber membrane often occurs in areas of high airflow concentrations, such as at the inlets and outlets for gas flows through the humidifying system.

To prevent the fracture of the hollow fiber membrane, high strength fibers may be located in areas of high airflow concentrations. However, high strength fibers tend to have a low humidifying property, which reduces the humidifying capacity of a humidifying system.

In general, the invention provides a humidifying device that can effectively prevent the fracture of the hollow fiber membrane while maintaining a high humidifying property. According to time present invention, the humidifying device exchanges moisture between a gas flow that flows inside of the hollow fiber membrane and a gas flow that flows outside of the hollow fiber membrane.

In one embodiment, the invention is directed to a device comprising a housing having an introducing pipe and a discharging pipe. A first gas flow flows into the housing through the introducing pipe. The first gas flow exits the housing through the discharging pipe. The device further comprises a fiber module that is covered by the housing, the fiber module having a case and a hollow fiber membrane stored in the case. The case includes an inflow opening through which the first gas flow flows into the case from a gap between a wall of the housing and the case, and a discharging opening through which the first gas flow flows from the case to the gap between the wall of the housing and the case, and a second gas flow flows through inside the hollow fiber membrane. The device further comprises a dividing wall that divides the gap into an introducing room and a discharging room. The inflow opening connects to the introducing room and the discharging opening connects to the discharging room. The position of the introducing pipe for the inflow opening is set toward the inside of the axial direction of the hollow fiber module or the position of the discharging pipe for the discharging opening is set toward the inside of the axial direction of the hollow fiber module.

In another embodiment, the invention is directed to a device comprising a humidifying system and a fuel cell stack that receives a humidified gas flow from the humidifying system and outputs a humidifying gas flow gas flow to the humidifying system. The humidifying system includes a housing having a first hollow center and a case having a second hollow center. The housing includes an introducing pipe, wherein a first gas flow flows through the introducing pipe to the first hollow center, and a discharging pipe, wherein the first gas flow exits the first hollow center through the discharging pipe. The case is at least partially located inside the first hollow center of the housing. The case includes a hollow fiber membrane within the second hollow center, an inflow inlet connected to the hollow fiber membrane wherein a second gas flows through the inflow inlet to the hollow fiber membrane, a discharging outlet connected to the hollow fiber membrane wherein the second gas flow exits the hollow fiber membrane through the discharging outlet, an inflow opening through which the first gas flow flows into the case from a gap between a wall of the housing and the case, and a discharging opening through which the first gas flow flows from the case to the gap between the wall of the housing and the case. The humidifying system further includes a dividing wall that divides the gap into an introducing room and a discharging room. The inflow opening connects to the introducing room, and the discharging opening connects to the discharging room. The introducing pipe is located adjacent to the dividing wall.

DETAILED DESCRIPTION

Figure 1:
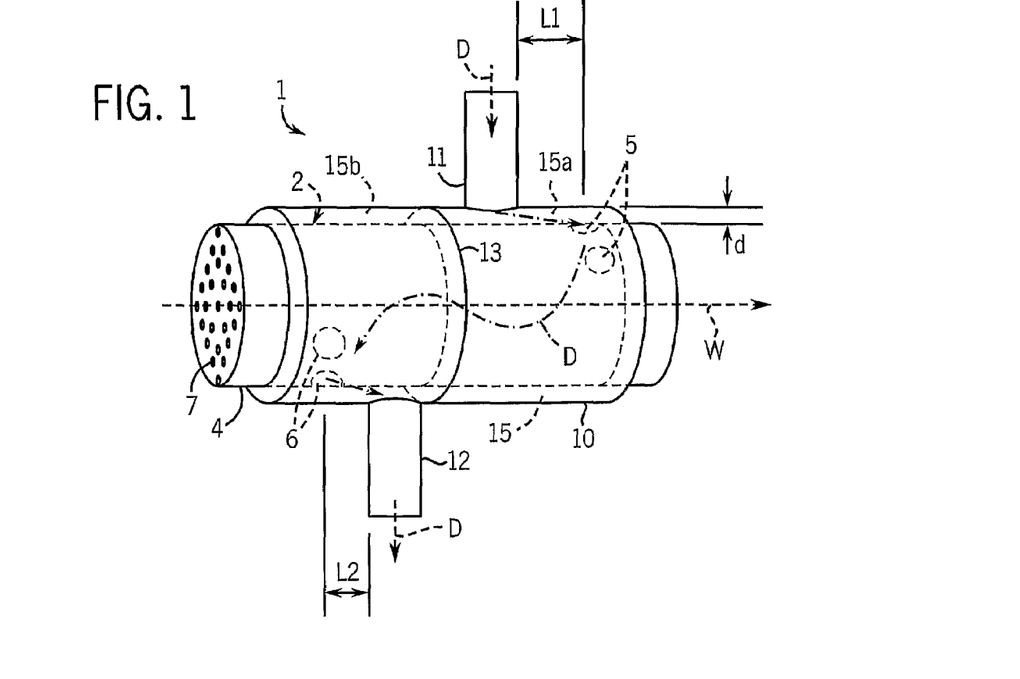
FIG. 1 is an oblique perspective view illustrating a humidifying device of a first exemplary embodiment.
Figure 2A:
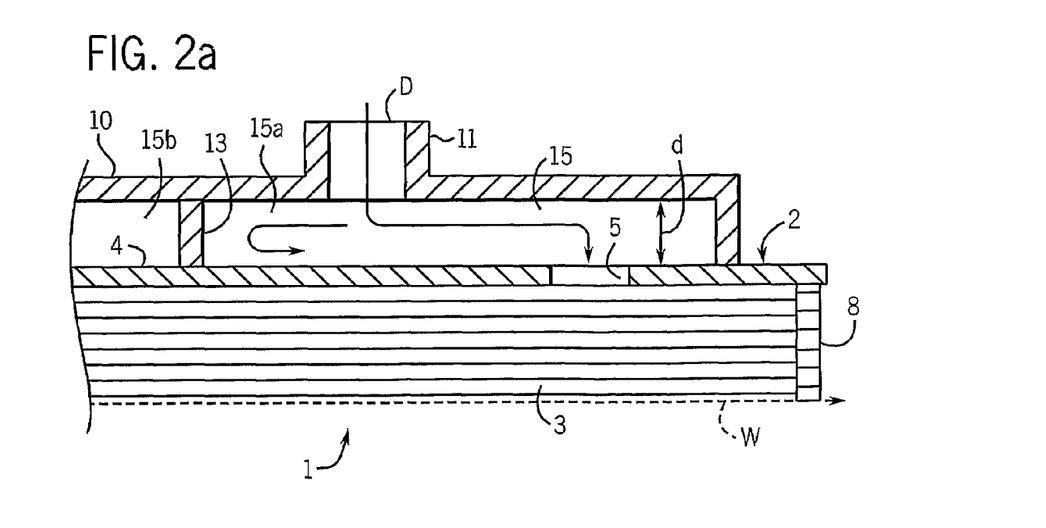
FIG. 2a is a cross-sectional view illustrating a part of the inner structure of the humidifying device of the first exemplary embodiment.
Figure 2B:
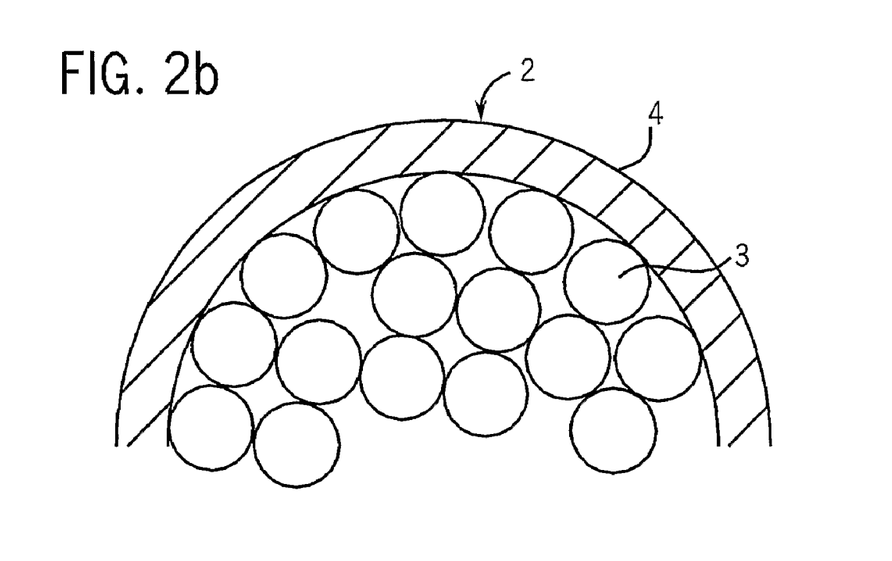
FIG. 2b is a partial cross-sectional view illustrating a hollow fiber module of the first exemplary embodiment.

FIG. 1 is a perspective view illustrating the humidifying device 1 of a first exemplary embodiment. Also, FIG. 2a is a cross-sectional view illustrating a part of the inner structure of the humidifying device 1. FIG. 2b is a partial cross-sectional view illustrating a hollow fiber module 2. The humidifying device 1 may be used in a fuel cell system.

A fuel cell system has a fuel cell, which produces electric power by generating an electrochemical reaction wherein hydrogen gas, which becomes the fuel, and air, which becomes oxidant, are supplied. The fuel cell has an electric power-generating unit including a cell with a fuel pole where hydrogen gas is supplied and an air pole where air is supplied. As the electrolyte of each cell, a solid high molecule type is often used considering densification of energy, decrease of the cost and reduction in weight. For example, a solid high molecular membrane may include an electrolyte made of an ion (proton)-conducting high molecular membrane such as fluorine resin group ion-exchange membrane and functions as the ion-conducting electrolyte by being saturated and hydroscopic.

In the fuel cell system, hydrogen gas and air in a humidified state are inlet gasses to humidify the solid high molecular electrolyte membrane. Humidifying device 1 of the present embodiment is used for humidifying hydrogen gas and air, which are supplied to the fuel cell stack in the fuel cell system.

Humidifying device 1 of the present embodiment humidities sweep gas D by exchanging water between humidified gas flow W, that is, hydrogen gas or air (hereinafter called off-gas) discharged from the fuel cell stack (not shown) and dry gas flow D, that is, hydrogen gas or air (hereinafter called sweep gas) supplied to the fuel cell stack. As shown in FIG. 1, humidifying device 1 comprises a hollow fiber module 2, an introducing pipe 11, which introduces gas (sweep gas D in the present embodiment) to the hollow fiber module 2, and a discharging pipe 12, which discharges gas (sweep gas D), which is humidified by passing through hollow fiber module 2 to the outside through hollow fiber module 2.

As shown in FIG. 1, hollow fiber module 2 includes water permeable hollow fiber membranes 3 stored in cylindrical case 4. Case 4 is shaped as a cylinder with open edges, and inflow openings 5 and discharging openings 6 of sweep gas D are placed on the outer peripheral wall of the case in the vicinity of the edges in the axial direction. Hollow fiber membrane 3 has a number of microscopic capillary tubes, which reach from the inside to the outside. Gaps among each of the hollow fiber membranes 3 in both of the edges of case 4 are sealed by potting material (sealing material).

In the hollow fiber module 2, off-gas W, which is discharged from the fuel cell stack flows through inflow inlet 7 at one of the edges of hollow fiber module 2 and is discharged from discharging outlet 8 at the other edge of hollow fiber module 2. In hollow fiber module 2, the off-gas W flows to the inside of hollow fiber membrane 3. Also, sweep gas D enters through inflow openings 5, which are in one edge of hollow fiber module 2, and is discharged from the other edge of discharging openings 6.

The humidifying device 1 exchanges water between a first gas flow (gas), which flows outside hollow fiber membrane 3 and humidifies the dried gas flow, and a second gas flow (gas), which flows inside hollow fiber membrane 3. According to the present embodiment, sweep gas D, which flows outside hollow fiber membrane 3, corresponds to the first gas flow, while off-gas W, which flows inside hollow fiber membrane 3, corresponds to the second gas flow.

The inflow opening 5 is the entrance of hollow fiber module 2 for sweep gas D, which is supplied to the fuel cell stack, and is located in the vicinity of one edge, which is the side of hollow fiber module 2 in which the off-gas is discharged. The inflow openings 5 are created at intervals on the outer circumferential wall of case 4 in the circumferential direction. Also, discharging opening 6 is the exit of the hollow fiber module 2 for sweep gas D and is located in the vicinity of the other edge, which is the side of hollow fiber module 2 in which the off-gas enters. The same number of discharging openings 6 as that of the inflow openings 5 is created on the outer circumferential wall of case 4.

Cylindrical housing 10 covers at least the outer circumference of the hollow fiber module 2. Introducing pipe 11 and discharging pipe 12 are connected to the peripheral wall of the housing 10 in the position diagonal to the circumferential direction. Introducing pipe 11 is connected to the peripheral wall of housing 10 to connect to gap 15 between housing 10 and case 4. Through the gap 15, introducing pipe 11 introduces sweep gas D to the inside hollow fiber membrane 2 from inflow openings 5. Also, discharging pipe 12 is connected to the peripheral wall of housing 10 so that it is connected with gap 15. Through gap 15, discharging pipe 12 discharges sweep gas D, which has passed through hollow fiber module 2, to the outside of hollow fiber module 2.

Between housing 10 and case 4, dividing wall 13 divides a circular space created by the gap 15 into an introducing side (introducing room 15a) where introducing pipe 11 and inflow openings 5 are placed and a discharging side (discharging room 15b) where discharging pipe 12 and discharging openings 6 are placed.

Here, as shown in FIG. 1, in humidifying device 1 the position at which introducing pipe 11 is connected to housing 10 for inflow openings 5 is set towards the inside of the axial direction of hollow fiber module 2 (axial direction of case 4). In other words, the position at which introducing pipe 11 is connected to housing 10 for inflow openings 5 is set in the side of discharging openings 6 in the axial direction of hollow fiber module 2. That is, the distance of the introducing pipe 11 and the discharging openings 6 along the axial direction of the case is shorter than the distance of the inflow openings 5 and the discharging openings 6 along the axial direction of the case. Also, the position at which discharging pipe 12 is connected to housing 10 for discharging openings 6 is set towards the inside of the axial direction of hollow fiber module 2. In other words, the position at which discharging pipe 12 is connected to housing 10 for discharging openings 6 is set in the side of inflow openings 5 in the axial direction of hollow fiber module 2.

According to the present embodiment, since the position at which introducing pipe 11 is connected to housing 10 is set as described above, the flow path of sweep gas D from introducing pipe 11 to inflow openings 5 becomes curved. As a result, it is possible to uniformly disperse sweep gas D from introducing pipe 11 and to introduce the gas to each inflow opening 5, thereby decreasing the likelihood of broken threads inside hollow fiber module 2. At the same time, since it is possible to almost uniformly introduce sweep gas D to each inflow opening 5, the flow path of sweep gas D inside hollow fiber module 2 is almost uniform, which provides good humidifying properties.

Since the introducing pipe 11 can be placed away from inflow openings 5, it is possible to increase the degree of freedom of the layout including introducing pipe 11. It is also possible to apply the fact to the discharging side (discharging room 15b). That is, it is possible to increase the effect of preventing the broken thread caused by concentration of the inflow of sweep gas D not only in the side of introducing pipe 11 but also in the vicinity of discharging pipe 12. Here, the present embodiment has a condition that the introducing pipe for the inflow openings is located in the side of the discharging openings along the axial direction of the hollow fiber module.

Conversely, when the introducing pipe for the inflow openings is located in the side opposite to the discharging openings in the axial direction of the hollow fiber module, the flow from the introducing pipe to the inflow openings has the same direction as the flow inside the hollow fiber module. Therefore, dispersion of the gas is not effectively made while the gas flows from the introducing pipe to the inflow openings, the gas flow concentrates on the inflow openings, which are next to the introducing pipe and easier for the gas to flow in, and the gas flows linearly. As a result, the effective effect obtained in the present embodiment may not be obtained.

Figure 3:
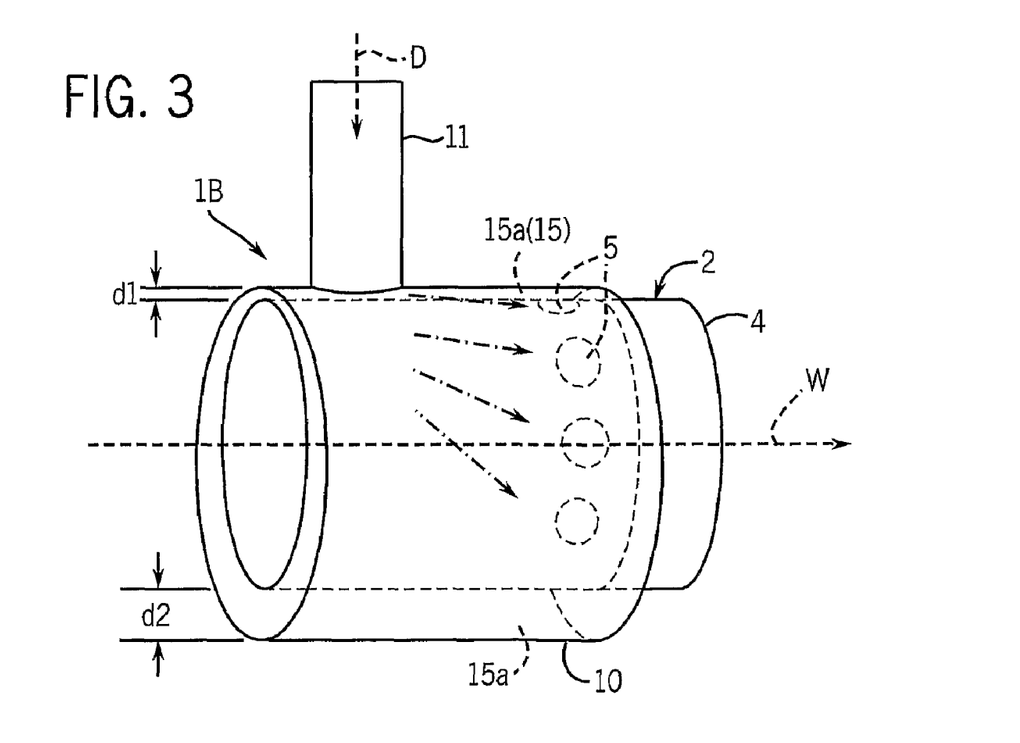
FIG. 3 is an oblique perspective view illustrating a humidifying device of a second exemplary embodiment.
Figure 4:
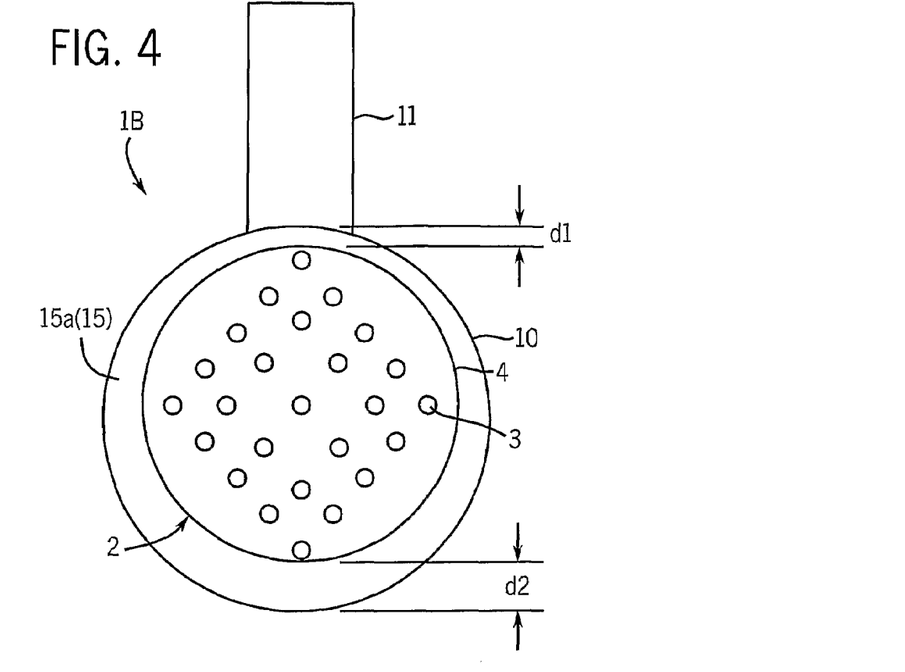
FIG. 4 is a cross-sectional view of the humidifying device of FIG. 3.

FIG. 3 is an oblique perspective view illustrating the substantial part of the humidifying device of the second exemplary embodiment. FIG. 4 is a cross-sectional view of the substantial part of FIG. 3.

As shown in FIGS. 3 and 4, in humidifying device 1B of the second exemplary embodiment, the positions of housing 10 and case 4 of hollow fiber module 2 in the radial direction are not coaxial. That is, by moving (decentering) the center axis of housing 10 and that of case 4, the size of gaps 15 between housing 10 and case 4 is decreased in the side where introducing pipe 11 is connected and increased in other parts. As a result, the size of a part of circularly-continuing gaps 15, which is closer to introducing pipe 11, is minimum size d1, mid the size of its opposite side is maximum size d2. As a result, the cross-sectional area of the path from introducing pipe 11 to inflow opening 5, which is located next to the introducing pipe 11, is decreased, and as inflow opening 5 is located further from introducing pipe 11, the cross-sectional area of the path from introducing pipe 11 is increased.

According to humidifying device 1B of the second exemplary embodiment, since gap 15 between housing 10 and case 4 is small in the vicinity of introducing pipe 11 compared with the structure where the size of the gap in the circumference is uniform as in the case of the humidifying device of the comparative example, it is possible to limit the flow of the gas flow to inflow opening 5, which is located close to introducing pipe 11 where the flow of sweep gas D easily concentrates. Also, it is possible to almost uniformly disperse sweep gas D in each of inflow openings 5 and further improve the effect of preventing the broken thread caused by the concentration of the flow of sweep gas D.

As for the discharging side, it is possible to obtain the same effect by placing the parts in a similar manner as described above.

Moreover, when it is not possible to freely determine the offset amount of introducing pipe 11 to inflow opening 5 and that of discharging pipe 12 to discharging opening 6 due to conditions limiting the placement of the equipment, if the structure of the second exemplary embodiment is used, the degree of the decentering of the center axis of housing 10 to the center axis of case 4 can make it possible to supplement the shortness of the offset amount.

Also, even when there is a condition limiting the placement of introducing pipe 11 as in the case of the third exemplary embodiment, if the structure of the second exemplary embodiment is used it is possible to effectively decrease the broken threads.

Figure 5A:
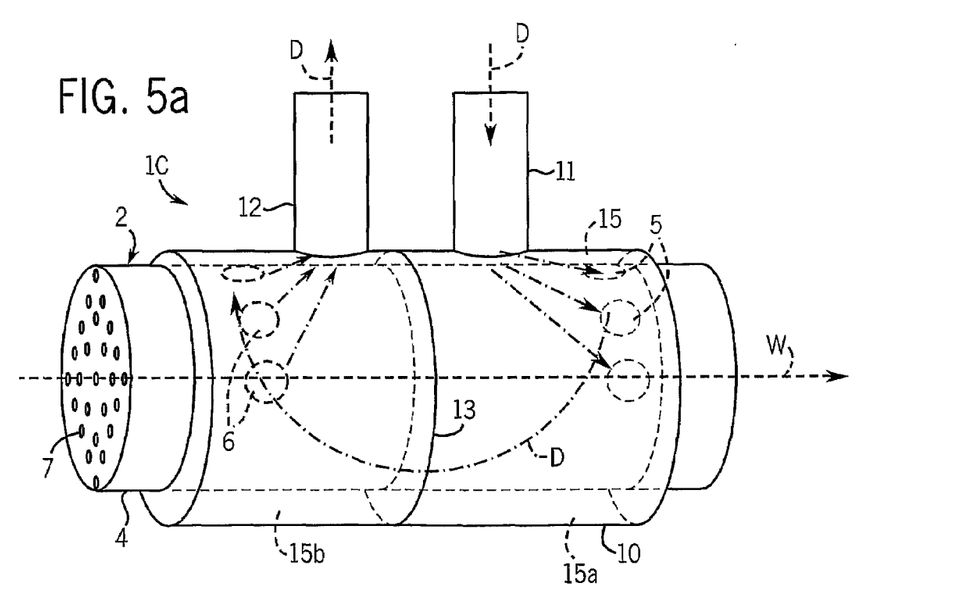
FIG. 5a is an oblique perspective view illustrating a humidifying device of a third exemplary embodiment.
Figure 5B:
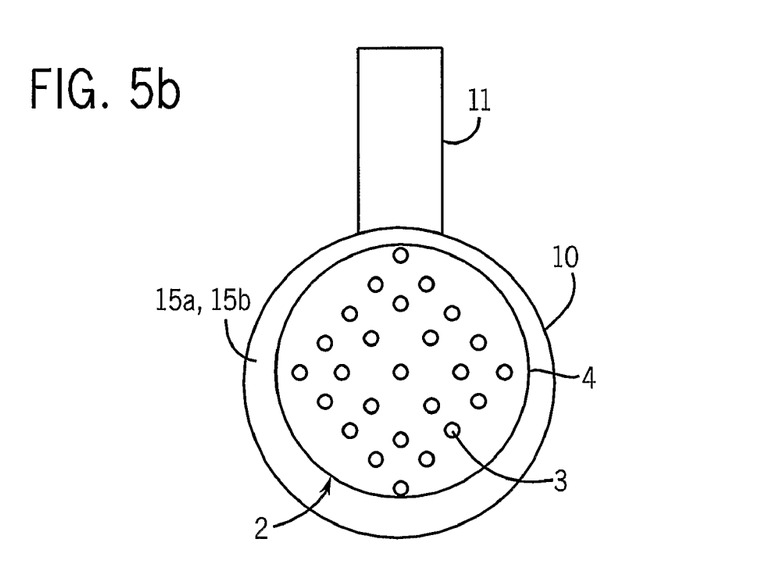
FIG. 5b is an oblique perspective view illustrating the humidifying device of the third exemplary embodiment.

FIG. 5a is ail oblique perspective view illustrating the substantial part of the humidifying device of the third exemplary embodiment, and FIG. 5b is a cross-sectional view of its substantial part.

In humidifying device 1C of the third exemplary embodiment, due to the relation to the peripheral devices of humidifying device 1C, introducing pipe 11 and discharging pipe 12 are placed in almost the same position in the circumferential direction of housing 10. When introducing pipe 11 and discharging pipe 12 are placed in almost the same position in the circumferential direction of housing 10, gas D easily flows into inflow openings 5 located next to introducing pipe 11 and at the same time gas is easily discharged from discharging openings 6 located next to discharging pipe 12. As a result, the flow of gas inside hollow fiber module 2 becomes especially disproportionate. However, in the third exemplary embodiment, the same structure as that of the second exemplary embodiment is used to decenter the center axis of case 4 towards the side of introducing pipe 11 and discharging pipe 12 with respect to the center axis of housing 10. As a result, it is possible to limit the inflow of gas D into inflow opening 5, which is located closer to introducing pipe 11 where gas D easily concentrates, and to limit the flow of gas D from discharging opening 6, which is located closer to discharging pipe 12, thereby effectively decreasing the broken thread even in the case where there is limitation in placing introducing pipe 11 and discharging pipe 12.

Figure 6:
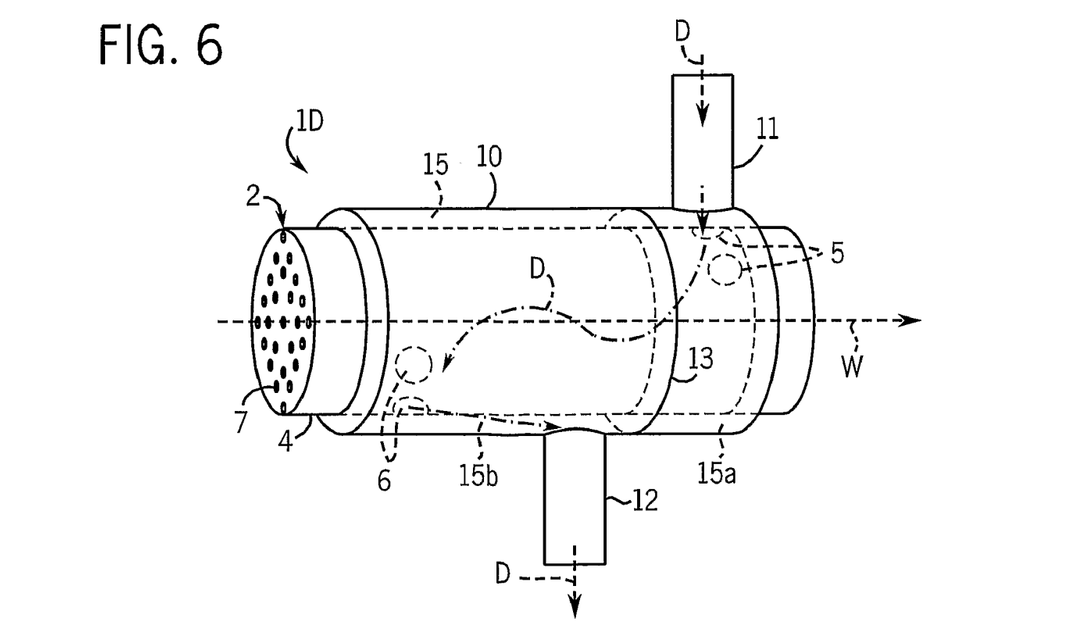
FIG. 6 is an oblique perspective view illustrating a humidifying device of a fourth exemplary embodiment.

FIG. 6 is an oblique perspective view illustrating the substantial part of the humidifying device of the fourth exemplary embodiment.

In humidifying device 1D of the fourth exemplary embodiment, the position of dividing wall 13 is moved from the position that evenly divides inflow openings 5 and discharging openings 6. For example, when the average flow rate in the introducing side where sweep gas D is introduced through introducing pipe 11 is faster than in the discharging side where sweep gas D is discharged through discharging pipe 12, dividing wall 13 is located towards the discharging side in the axial direction of hollow fiber module 2. Conversely, when the average flow rate in the discharging side is faster than in the introducing side, dividing wall 13 is located towards the introducing side in the axial direction of hollow fiber module 2. The example shown in FIG. 6 illustrates the latter case.

Due to the differences in the temperature and pressure conditions before and after hollow fiber module 2, the average flow rate of the gas flow in the introducing side and discharging side does not always coincide. As a result, the frequency of the broken thread in the introducing side may be different from that of the discharging side. In humidifying device 1D of the present embodiment, the position of dividing wall 13 between housing 10 and case 4 is moved in the axial direction as described above. As a result, it is possible to distribute the load to the part where the flow rate is faster and the part where the flow rate is slower, thereby improving the anti-thread breakage in the entire humidifying device.

Figure 7:
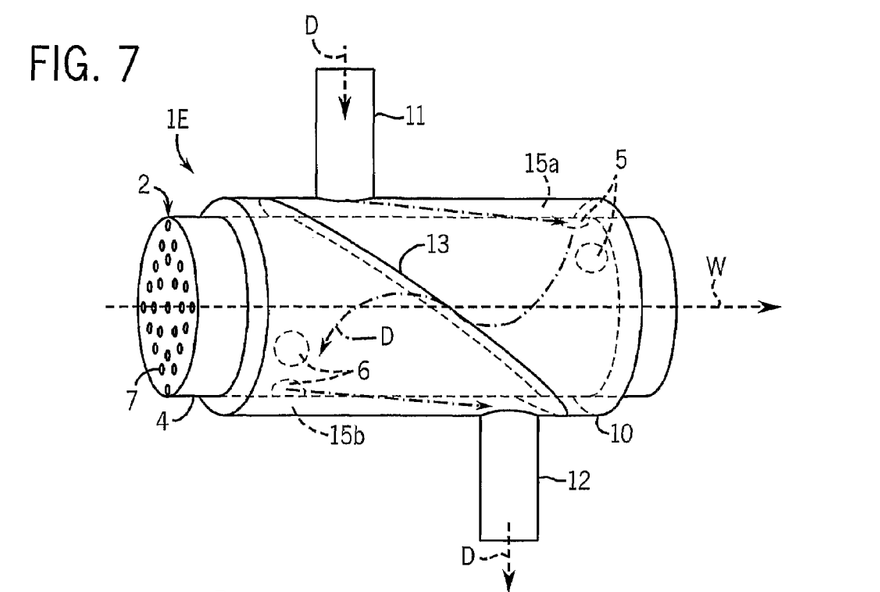
FIG. 7 is an oblique perspective view illustrating a humidifying device of a fifth exemplary embodiment.

FIG. 7 is an oblique perspective view illustrating the substantial part of the humidifying device of the fifth exemplary embodiment.

In humidifying device 1E of the fifth exemplary embodiment, dividing wall 13 is located diagonally to the axial direction of hollow fiber module 2. By diagonally placing dividing wall 13, the distance between inflow opening 5 and dividing wall 13 or the distance between discharging opening 6 and dividing wall 13 is enlarged both in the side where introducing pipe 11 is connected and the side where discharging pipe 12 is connected.

Therefore, it is possible to increase the offset amount when introducing pipe 11 and discharging pipe 12 are connected to housing 10. By increasing the offset amount both in the introducing side (introducing room 15a) and discharging side (discharging room 15b), it is possible to further improve the anti-thread breakage. As a result, the humidifying device is effective when the target life span to the average flow rate of sweep gas and the strength of the thread is high.

Figure 8:
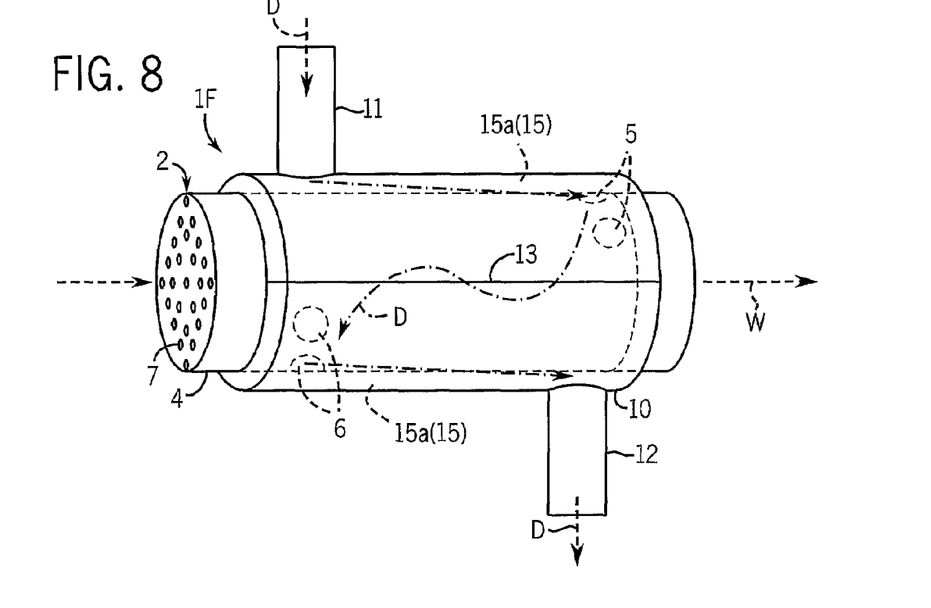
FIG. 8 is an oblique perspective view illustrating a humidifying device of a sixth exemplary embodiment.

FIG. 8 is an oblique perspective view illustrating the substantial part of the humidifying device of the sixth exemplary embodiment.

In humidifying device 1F of the sixth exemplary embodiment, introducing pipe 11 is located opposite to discharging pipe 12 in the circumferential direction of housing 10. Introducing pipe 11 and inflow openings 5 are placed in the same side, and discharging pipe 12 and discharging openings 6 are placed in the same side. Introducing pipe 11 and inflow openings 5 are placed opposite to discharging pipe 12 and discharging openings 6 in the axial direction.

Dividing wall 13 is located almost parallel to the axial direction of hollow fiber module 2 and, by dividing the space created by gap 15 between housing 10 and case 4 in the direction of the diameter of housing 10 and case 4, the dividing wall 13 creates the introducing side (introducing room 15a), which contains introducing pipe 11 and inflow openings 5, and the discharging side (discharging room 15b), which contains discharging pipe 12 and discharging openings 6.

In humidifying device 1F, by placing dividing wall 13 almost parallel to the longitudinal direction of the housing (almost parallel to the axial direction of hollow fiber module 2), introducing pipe 11 and inflow openings 5 are placed in both sides of housing 10 in the longitudinal direction and at the same time discharging pipe 12 and discharging openings 6 are placed in both sides of housing 10 in the longitudinal direction, thereby simultaneously securing the maximum offset amount both in the side of introducing pipe 11 and that of discharging pipe 12. As described above, since the maximum offset amount of introducing pipe 11 and discharging pipe 12 can be secured, in the present embodiment it is possible to further increase the anti-thread breakage. Here, it is preferable to use the sixth exemplary embodiment when inflow openings 5 and discharging openings 6 can be placed in an area that is half the area of the circumference of case 4; each individual inflow opening 5 and discharging opening 6 can be made in a large size, and its necessary circulating ability can be secured.

As another embodiment, for example, when the pipe diameter of introducing pipe 11 and that of discharging pipe 12 are different, the offset length of inflow opening 5 or discharging opening 6 with a smaller pipe diameter is made larger than the offset length of inflow opening 5 or discharging opening 6 with a larger pipe diameter. The offset length of inflow opening 5 is the distance between inflow opening 5 and introducing pipe 11. Similarly the offset length of discharging opening 6 is the distance between discharging opening 6 and discharging pipe 12.

By increasing the offset length of introducing pipe 11 or discharging pipe 12 in the side where the flow rate around the pipe entrance is fast, it is possible to decrease the diameter of introducing pipe 11 and discharging pipe 12 without increasing the distribution of the flow of the gas flow in hollow fiber module 2 as a whole while maintaining the anti-thread breakage.

When the cross-sectional shapes of introducing pipe 11 and discharging pipe 12 are different, the offset length of inflow opening 5 or discharging opening 6 with a faster flow rate is made larger than the offset length of inflow opening 5 or discharging opening 6 with a slower flow rate.

By increasing the offset length of the introducing pipe or the discharging pipe in the side where the flow rate around the pipe entrance is fast, it is possible to make introducing pipe 11 and discharging pipe 12 in shapes other than the cylindrical shape, for example an ellipse, without increasing the distribution of the gas flow in hollow fiber module 2 as a whole while maintaining the anti-thread breakage properties.

Here it is described that the second gas flow, which flows inside hollow fiber membrane 3, is a humidifying gas flow (off-gas W), and the first gas flow, which flows outside hollow fiber membrane 3, is a dry gas flow (sweep gas D). Conversely, the second gas flow, which flows inside hollow fiber membrane 3, may be a dry gas flow (sweep gas D), and the first gas flow, which flows outside hollow fiber membrane 3, may be a humidified gas flow (off-gas W). In this case, it is possible to obtain the similar effect.

In a structure where the introducing pipe is connected towards the inflow opening in the axial direction, and where the offset length is L1, the maximum offset length is L1max, and the minimum offset length is L1min, it is preferable to set the range as L1max>L1>L1min. When the position where the introducing pipe is connected to the housing is set so that the range is L1min>L1, the gas flow from the introducing pipe may concentrate on the inflow opening, which is close to the introducing pipe.

On the other hand, when the position where the introducing pipe is connected to the housing is set so that the range is L1>L1max, another gas flow is generated in the process where, after the gas flow enters the inside of the housing, it flows to the inflow openings. As a result, a large dispersing effect may not be obtained. Also, it is preferable to use the offset length with which the gas flow introduced through the introducing pipe does not directly enter the inflow openings, that is, the offset length with which the side edge of the inflow opening of the introducing pipe does not coincide with the side edge of the introducing pipe of the inflow opening.

Based on the same reason described below, in the structure where the discharging pipe is connected towards the discharging opening in the axial direction, and where the offset length is L2, the maximum offset length is L2max, and the minimum offset length is L2min, it is preferable to set the range as L2max>L2>L2min. Also, it is preferable to use the offset length with which the gas flow discharged from the discharging openings is not directly discharged to the discharging pipe, that is, the offset length with which the side edge of the discharging pipe of the discharging opening does not coincide with the side edge of the discharging opening of the discharging pipe.

The invention claimed is:

1. A device comprising:
    a hollow fiber module including a tubular case and a hollow fiber membrane extending axially through the case, the case including an inflow opening and a discharging opening in a circumferential surface of the case;
    a housing covering a length of the fiber module and having a larger diameter than the case such that a gap is formed between the case and the housing;
    an introducing pipe connected to a circumferential surface of the housing and a discharging pipe connected to the circumferential surface of the housing; and
    a dividing wall that divides the gap into an introducing room in fluid communication with the introducing pipe and the inflow opening and a discharging room in fluid communication with the discharging pipe and the discharging opening;
    wherein at least one of a position of the introducing pipe for the inflow opening is offset in an axial direction of the hollow fiber module from the inflow opening and a position of the discharging pipe for the discharging opening is offset in the axial direction of the hollow fiber module from the discharging opening.

2. The device of claim 1, wherein the discharging pipe is located adjacent to the dividing wall.

3. The device of claim 1, wherein the introducing pipe is located closer to the dividing wall than to the inflow opening as measured along the axial direction of the hollow fiber module.

4. The device of claim 1, wherein the gap is smaller adjacent to the introducing pipe than it is opposite to the introducing pipe relative to the axial direction of the hollow fiber module.

5. The device of claim 1, wherein the dividing wall is positioned towards a side of the case adjacent to the discharging pipe in the axial direction of the hollow fiber module.

6. The device of claim 1, wherein the dividing wall is located towards a side of the case adjacent to the introducing pipe in the axial direction of the hollow fiber module.

7. The device of claim 1, wherein the dividing wall is located on a diagonal to the axial direction of the hollow fiber module.

8. The device of claim 1, wherein the dividing wall is approximately parallel to the axial direction of the hollow fiber module.

9. The device of claim 1, wherein the introducing pipe is located approximately opposite to the discharging pipe along a circumference of the housing.

10. The device of claim 1, wherein the introducing pipe is located in approximately the same circumferential position along a circumference of the housing as the discharging pipe.

11. The device of claim 1, wherein a diameter of the introducing pipe is larger than a diameter of the discharging pipe, and the discharging pipe is located at a greater axial distance from the discharge opening than the axial distance between the introducing pipe and the inflow opening.

12. The device of claim 1, wherein a diameter of the introducing pipe is smaller than a diameter of the discharging pipe, and the discharging pipe is located at a lesser axial distance from the discharge opening than the axial distance between the introducing pipe and the inflow opening.

13. The device of claim 1, wherein the introducing pipe is located so that the distance between the introducing pipe and the inflow opening is a maximum distance allowed by the size of the housing and the location of the dividing wall.

14. The device of claim 1, wherein the hollow fiber module and the housing are configured so a first gas introduced into the introducing pipe would run through the introducing pipe and into the introducing room, through the inflow opening and into the hollow fiber module, through the hollow fiber module adjacent to the hollow fiber membrane, through the discharging opening and into the discharging room, and through the discharging pipe, and so that a second gas introduced to the hollow fiber membrane would run through the hollow fiber membrane.

15. The device of claim 14, wherein a cross-sectional shape of the introducing pipe is different than a cross-sectional shape of the discharging pipe, a flow rate of the first gas through the introducing pipe is greater than a flow rate of the first gas through the discharging pipe, and the introductory pipe is located at a greater axial distance from the inflow opening than the axial distance between the discharging pipe and discharging opening.

16. The device of claim 14, wherein the first gas flow is a humidifying gas flow and the second gas flow is a dry gas flow.

17. The device of claim 14, wherein the first gas flow is a dry gas flow and the second gas flow is a humidifying gas flow.

18. A system comprising:
a humidifying system including:
    a housing having a first hollow center;
    an introducing pipe connected to a circumferential surface of the housing and in fluid communication with the first hollow center;
    a discharging pipe connected to a circumferential surface of the housing in fluid communication with the first hollow center;
    a case having a second hollow center, the case having a smaller diameter than the housing and at least partially located inside the first hollow center of the housing such that a gap is formed between the case and the housing;
    a hollow fiber membrane extending axially through the second hollow center;
    an inflow inlet connected to one end of the hollow fiber membrane;
    a discharging outlet connected to an opposed end of the hollow fiber membrane;
    an inflow opening on a circumferential surface of the case and in fluid communication with the gap;
    a discharging opening on vim circumferential surface of the case and in fluid communication with the gap; and
    a dividing wall between the housing and the case and dividing the gap into an introducing room in fluid communication with the inflow opening and the introducing pipe and a discharging room in fluid communication with the discharging opening and the discharging pipe;
wherein the introducing pipe is located adjacent to the dividing wall; and
the humidifying system is configured such that a first gas input would flow in sequence through the introducing pipe, the inflow opening, the introducing room, the second hollow center, the discharging opening, the discharging room, and the discharging pipe and such that a second gas input would flow through the hollow fiber membrane; and
a fuel cell stack configured to receive a humidified gas flow from the humidifying system and to output a humidifying gas flow to the humidifying system.

19. The device of claim 18, wherein the humidified gas flow is the first gas flow and the humidifying gas flow is the second gas flow.

20. The device of claim 18, wherein the humidified gas flow is the second gas flow and the humidifying gas flow is the first gas flow.

* * * * *